(12) United States Patent
Tanaka et al.

(10) Patent No.: US 10,124,315 B2
(45) Date of Patent: Nov. 13, 2018

(54) WATER-ABSORBENT RESIN PRODUCTION APPARATUS

(71) Applicant: Sumitomo Seika Chemicals Co., Ltd., Kako-gun, Hyogo (JP)

(72) Inventors: Muneaki Tanaka, Hyogo (JP); Nobutsugu Okazawa, Hyogo (JP); Masato Kotake, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 15/552,321

(22) PCT Filed: Feb. 23, 2016

(86) PCT No.: PCT/JP2016/055308
§ 371 (c)(1),
(2) Date: Aug. 21, 2017

(87) PCT Pub. No.: WO2016/136761
PCT Pub. Date: Sep. 1, 2016

(65) Prior Publication Data
US 2018/0036707 A1 Feb. 8, 2018

(30) Foreign Application Priority Data

Feb. 24, 2015 (JP) .................. 2015-034458

(51) Int. Cl.
*B01J 19/24* (2006.01)
*C08F 2/01* (2006.01)
(Continued)

(52) U.S. Cl.
CPC .......... *B01J 19/24* (2013.01); *B01J 19/0006* (2013.01); *C08F 2/01* (2013.01); *C08F 6/04* (2013.01);
(Continued)

(58) Field of Classification Search
CPC .......... B01J 19/24; B01J 19/0006; C08F 2/01; C08F 20/00
(Continued)

(56) References Cited

U.S. PATENT DOCUMENTS 3,661,815 A 5/1972 Smith
4,076,663 A 2/1978 Masuda et al.
(Continued)

FOREIGN PATENT DOCUMENTS

EP 0234202 A1 9/1987
JP S4943395 B1 11/1974
(Continued)

OTHER PUBLICATIONS

International Search Report PCT/ISA/210 for International Application No. PCT/JP2016/055308 dated Feb. 23, 2016.
(Continued)

*Primary Examiner* — Huy Tram Nguyen
(74) *Attorney, Agent, or Firm* — Harness, Dickey & Pierce, P.L.C.

(57) ABSTRACT

In a water-absorbent resin production apparatus for producing a water-absorbent resin by polymerizing a water-soluble ethylenically unsaturated monomer, a water-absorbent resin powder obtained by drying a water-absorbent resin composition with a dryer passes through a first powder flow path pipe, is discharged therefrom toward a classifier while a flow rate is regulated so as to a predetermined value by a powder flow rate regulating discharge member composed of a hopper and a rotary valve, and is classified by the classifier. In the water-absorbent resin production apparatus, a collector for collecting a powder aggregate composed of aggregated particles of the water-absorbent resin powder is disposed in the first powder flow path pipe. Accordingly, a water-absorbent resin in the form of a particulate powder from
(Continued)

which the powder aggregate is removed can be produced at a high production efficiency.

5 Claims, 5 Drawing Sheets

(51) Int. Cl.
 *C08F 20/00* (2006.01)
 *C08F 6/04* (2006.01)
 *B01J 19/00* (2006.01)
(52) U.S. Cl.
 CPC ..... *C08F 20/00* (2013.01); *B01J 2219/00164* (2013.01); *B01J 2219/24* (2013.01)
(58) Field of Classification Search
 USPC .......................................................... 422/131
 See application file for complete search history.

(56) References Cited

U.S. PATENT DOCUMENTS

| | | | |
|---|---|---|---|
| 4,446,261 A | 5/1984 | Yamasaki et al. | |
| 2006/0167198 A1* | 7/2006 | Sasabe ................. | B01J 19/123 526/317.1 |
| 2008/0202987 A1 | 8/2008 | Weismantel et al. | |
| 2009/0266747 A1 | 10/2009 | Stueven et al. | |
| 2010/0249320 A1* | 9/2010 | Matsumoto ............. | C08F 6/008 524/832 |
| 2013/0098809 A1 | 4/2013 | Stueven et al. | |
| 2013/0274088 A1* | 10/2013 | Handa ...................... | C08F 2/32 502/7 |
| 2015/0240013 A1 | 8/2015 | Matsumoto et al. | |

FOREIGN PATENT DOCUMENTS

| | | |
|---|---|---|
| JP | S51125468 A | 11/1976 |
| JP | S5214689 A | 2/1977 |
| JP | S5721405 A | 2/1982 |
| JP | S57158209 A | 9/1982 |
| JP | S62172006 A | 7/1987 |
| JP | H6-107800 A | 4/1994 |
| JP | H11267593 A | 10/1999 |
| JP | 2008526498 A | 7/2008 |
| JP | 2012192387 A | 10/2012 |
| JP | 2015145507 A | 8/2015 |
| WO | WO-2014/021432 A1 | 2/2014 |

OTHER PUBLICATIONS

International Preliminary Report on Patentability and English translation thereof dated Sep. 8, 2017.

* cited by examiner (1)

(2)

(3)

(4)

WATER-ABSORBENT RESIN PRODUCTION APPARATUS

TECHNICAL FIELD

The present invention relates to a water-absorbent resin production apparatus for polymerizing a water-soluble ethylenically unsaturated monomer to produce a water-absorbent resin.

BACKGROUND ART

A water-absorbent resin has been widely used for hygiene products such as disposable diapers or sanitary products, products for daily use such as sheets for pets, industrial materials such as water-absorbent sheets for food, water-blocking materials for cables, or dew-catchers, water retention agents for greening, agriculture, and gardening, soil conditioners, and the like. This water-absorbent resin is particularly used for hygiene products among the above-described uses.

Typically, such a water-absorbent resin is a lightly-crosslinked polymer. For example, a starch-based water-absorbent resin such as a starch-acrylonitrile graft copolymer hydrolysate (refer to Patent Literature 1) or a starch-acrylic acid graft copolymer neutralized product (refer to Patent Literature 2), a vinyl acetate-acrylic acid ester copolymer saponified product (refer to Patent Literature 3), and a partially neutralized product of polyacrylic acid (refer to Patent Literatures 4, 5, and 6) are known.

The water-absorbent resin is produced as a particulate powder by polymerizing a water-soluble ethylenically unsaturated monomer in a polymerization reactor to obtain a water-absorbent resin composition and drying the obtained water-absorbent resin composition in a dryer.

During the production of the water-absorbent resin, the water-absorbent resin as a polymer of the water-soluble ethylenically unsaturated monomer may adhere on, for example, an inner wall surface of the polymerization reactor or the dryer, and this adhered material may function as a core such that the water-absorbent resin powder grows and aggregates to produce a powder aggregate. The properties of the powder aggregate as the water-absorbent resin are likely to be poor. Therefore, when the water-absorbent resin is produced as a particulate powder, it is necessary to remove this powder aggregate.

As a method of removing the powder aggregate during the production of the water-absorbent resin, a method of drying the water-absorbent resin powder and then classifying the dry powder using a classifier is generally known (refer to Patent Literature 7).

CITATION LIST

Patent Literature

[Patent Literature 1] Japanese Examined Patent Publication JP-B 49-43395 (1974)
[Patent Literature 2] Japanese Unexamined Patent Publication JP-A 51-125468 (1976)
[Patent Literature 3] Japanese Unexamined Patent Publication JP-A 52-14689 (1977)
[Patent Literature 4] Japanese Unexamined Patent Publication JP-A 62-172006 (1987)
[Patent Literature 5] Japanese Unexamined Patent Publication JP-A 57-158209 (1982)
[Patent Literature 6] Japanese Unexamined Patent Publication JP-A 57-21405 (1982)
[Patent Literature 7] Japanese Unexamined Patent Publication JP-A 6-107800 (1994)

SUMMARY OF INVENTION

Technical Problem

When the water-absorbent resin powder which is dried using the dryer flows into the classifier, it is necessary to cause the powder to flow into the classifier while the flow rate is regulated so as to be a predetermined value in order to improve the classification efficiency of the classifier. Therefore, a powder flow rate regulating discharge member such as a rotary valve or a screw feeder is disposed between the dryer and the classifier.

In the related art, the powder aggregate can be removed by classifying the water-absorbent resin powder dried in the dryer, using the classifier. However, the powder aggregate flows into the powder flow rate regulating discharge member such as a rotary valve or a screw feeder which is disposed between the dryer and the classifier.

In this way, in a case where the powder aggregate flows into the powder flow rate regulating discharge member such as a rotary valve or a screw feeder, for example, the powder aggregate may get involved in a driving portion of the powder flow rate regulating discharge member. In this case, the drive load increases such that the driving of the powder flow rate regulating discharge member becomes unstable and stops. As a result, the production efficiency of the water-absorbent resin decreases.

An object of the invention is to provide a water-absorbent resin production apparatus for polymerizing a water-soluble ethylenically unsaturated monomer to produce a water-absorbent resin, in which the water-absorbent resin as a particulate powder can be produced with high production efficiency in a state where a powder aggregate is removed therefrom.

Solution to Problem

The invention provides a water-absorbent resin production apparatus including:

a polymerization reactor provided with a resin composition outflow opening portion, in the polymerization reactor a water-soluble ethylenically unsaturated monomer being polymerized to obtain a water-absorbent resin composition including a water-absorbent resin as a polymer of the water-soluble ethylenically unsaturated monomer, the water-absorbent resin composition flowing out from the polymerization reactor through the resin composition outflow opening portion;

a resin composition flow path member having one end portion connected to the resin composition outflow opening portion, the resin composition flow path member functioning as a flow path through which the water-absorbent resin composition flowing out from the resin composition outflow opening portion passes;

a dryer drying the water-absorbent resin composition to obtain a water-absorbent resin powder, the dryer being provided with a resin composition inflow opening portion which is connected to the other end portion of the resin composition flow path member, and a powder outflow opening portion, the water-absorbent resin composition passing through an inside of the resin composition flow path member and flowing into the dryer through the resin composition inflow opening portion, the water-absorbent resin powder being obtained by drying the water-absorbent resin composition in the dryer and flowing out from the dryer through the powder outflow opening portion;

a powder flow path member having one end portion connected to the powder outflow opening portion, the powder flow path member functioning as a flow path through which the water-absorbent resin powder flowing out from the powder outflow opening portion passes;

a collector disposed in the powder flow path member, the collector collecting a powder aggregate having a greater size than a predetermined size in a powder aggregate of the water-absorbent resin powder passing through the inside of the powder flow path member;

a powder flow rate regulating discharge member connected to the other end portion of the powder flow path member, the powder flow rate regulating discharge member discharging the water-absorbent resin powder which passes through the collector, while regulating a flow rate at which the water-absorbent resin powder is discharged from the powder flow rate regulating discharge member, so as to be a predetermined value; and a classifier connected to the powder flow rate regulating discharge member, the classifier classifying the water-absorbent resin powder discharged from the powder flow rate regulating discharge member.

In addition, in the water-absorbent resin production apparatus according to the invention, it is preferable that the collector includes a plurality of rod-shaped members disposed parallel to each other at intervals, the intervals being greater than a size of the water-absorbent resin powder and less than or equal to the predetermined size of the powder aggregate, and a connecting member connecting the plurality of rod-shaped members.

In addition, in the water-absorbent resin production apparatus according to the invention, it is preferable that the plurality of rod-shaped members are tilted in the powder flow path member with respect to horizon.

In addition, in the water-absorbent resin production apparatus according to the invention, it is preferable that the plurality of rod-shaped members are columnar or cylindrical members.

Advantageous Effects of Invention

According to the invention, the water-soluble ethylenically unsaturated monomer is polymerized to obtain a water-absorbent resin composition including a water-absorbent resin in the polymerization reactor, and this water-absorbent resin composition flows out from the polymerization reactor through the resin composition outflow opening portion. The water-absorbent resin composition which flows out from the resin composition outflow opening portion passes through the resin composition flow path member, and flows into the dryer through the resin composition inflow opening portion of the dryer. The water-absorbent resin composition is dried to obtain a water-absorbent resin powder in the dryer, and this water-absorbent resin powder flows out from the dryer through the powder outflow opening portion. The water-absorbent resin powder which flows out from the powder outflow opening portion passes through the powder flow path member, is discharged to the classifier by the powder flow rate regulating discharge member while the flow rate is regulated so as to be a predetermined value, and is classified by the classifier.

In the water-absorbent resin production apparatus having the above-described configuration, the collector collecting the powder aggregate composed of a water-absorbent resin powder aggregate with a greater size than the predetermined size is disposed in the powder flow path member through which the water-absorbent resin powder obtained by drying the water-absorbent resin composition in the dryer passes and which has the other end portion connected to the powder flow rate regulating discharge member.

In the water-absorbent resin production apparatus according to the invention, the collector collecting the powder aggregate is disposed in the powder flow path member through which the water-absorbent resin powder passes. Therefore, the powder aggregate can be prevented from flowing into the powder flow rate regulating discharge member connected to the other end portion of the powder flow path member on the classifier side. As a result, the powder aggregate is prevented from, for example, getting involved in a driving portion of the powder flow rate regulating discharge member, an increase in the drive load is suppressed, and the driving of the powder flow rate regulating discharge member can be prevented from becoming unstable and stopping. Therefore, a decrease in the production efficiency of the water-absorbent resin can be suppressed. Accordingly, in the water-absorbent resin production apparatus according to the invention, the water-absorbent resin as a particulate powder can be produced with high production efficiency in a state where the powder aggregate is removed therefrom.

In addition, according to the invention, the collector can be achieved by including a plurality of rod-shaped members which are disposed parallel to each other at intervals which are greater than a size of the water-absorbent resin powder and less than or equal to the predetermined size of the powder aggregate, and a connecting member which connects the plurality of rod-shaped members.

In addition, according to the invention, the plurality of rod-shaped members constituting the collector are tilted in the powder flow path member with respect to horizon. As a result, the powder aggregate collected by the collector can be collected on a downstream side in the tilting direction. Therefore, the entire portion of the collector in the powder flow path member is suppressed from being blocked by the powder aggregate, and thus a flow path through which the water-absorbent resin powder passes can be secured in the powder flow path member.

In addition, according to the invention, the plurality of rod-shaped members constituting the collector are columnar or cylindrical members. As a result, as compared to a case where the rod-shaped members are formed of, for example, a member having corners, the crushing of the powder aggregate, which may occur when colliding with the rod-shaped members, can be suppressed. As a result, the crushed powder aggregate, whose properties as the water-absorbent resin are likely to be poor, can be suppressed from passing through the collector.

BRIEF DESCRIPTION OF DRAWINGS

Other and further objects, features, and advantages of the invention will be more explicit from the following detailed description taken with reference to the drawings wherein.

DESCRIPTION OF EMBODIMENTS

Hereinafter, a preferred embodiment of the invention will be described in detail with reference to the drawings.

Figure 1:
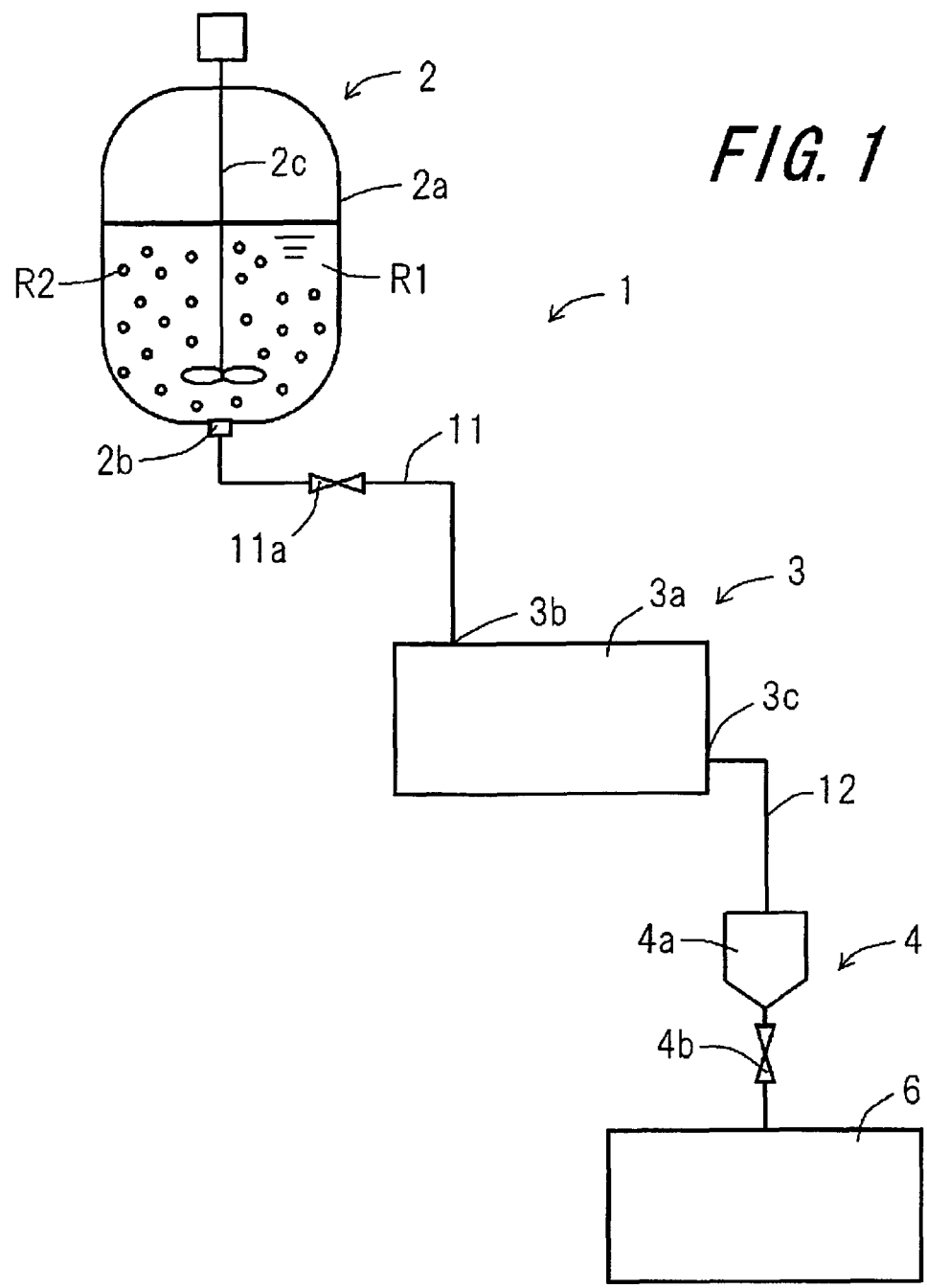
FIG. 1 is a schematic diagram showing a configuration of a water-absorbent resin production apparatus 1 according to an embodiment of the invention.
Figure 2:
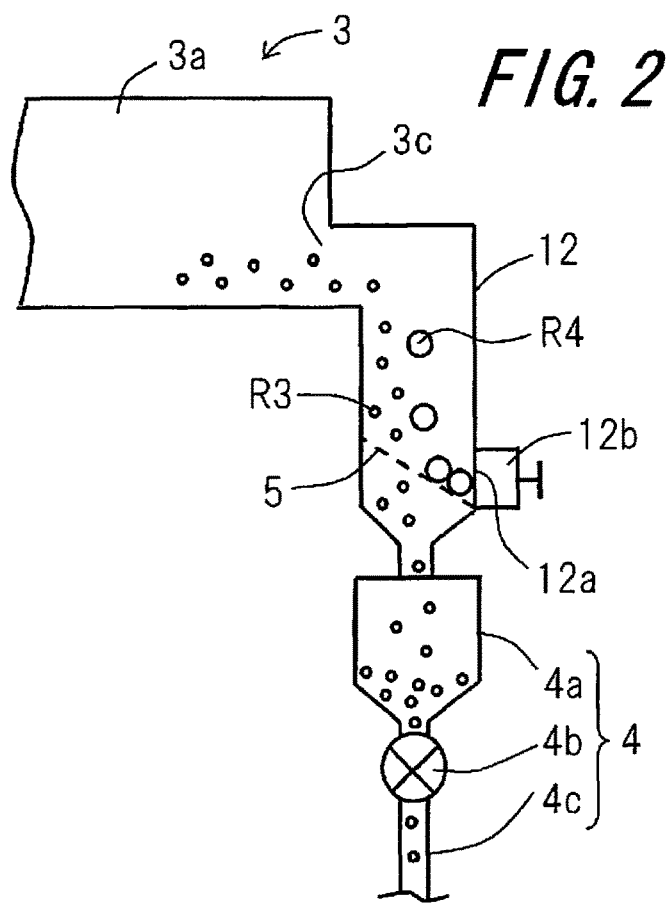
FIG. 2 is an enlarged view schematically showing the vicinity of a powder outflow opening portion 3c of a dryer 3 in the water-absorbent resin production apparatus 1.

FIG. 1 is a schematic diagram showing a configuration of a water-absorbent resin production apparatus 1 according to an embodiment of the invention. FIG. 2 is an enlarged view schematically showing the vicinity of a powder outflow opening portion 3c of a dryer 3 in the water-absorbent resin production apparatus 1. The water-absorbent resin can be produced by polymerizing a water-soluble ethylenically unsaturated monomer. A method of polymerizing the water-soluble ethylenically unsaturated monomer is not particularly limited, and a representative polymerization method such as an aqueous polymerization method, an emulsion polymerization method, or a reversed phase suspension polymerization method can be used.

In the aqueous polymerization method, polymerization is performed by heating an aqueous solution of the water-soluble ethylenically unsaturated monomer, an internal crosslinking agent, and a water-soluble radical polymerization initiator while stirring them as necessary. In the aqueous polymerization method, water is used as a liquid medium, and the polymerization reaction is performed in a state where the water-soluble ethylenically unsaturated monomer is in the form of an aqueous solution.

In addition, in the reversed phase suspension polymerization method, for example, polymerization is performed by heating an aqueous solution of the water-soluble ethylenically unsaturated monomer, a surfactant, a hydrophobic polymeric dispersant, a water-soluble radical polymerization initiator, and an internal crosslinking agent in a petroleum hydrocarbon aqueous dispersion medium while stirring them. In the reversed phase suspension polymerization method, water and the petroleum hydrocarbon aqueous dispersion medium are used as liquid media, and the polymerization reaction is performed in a state where the aqueous solution of the water-soluble ethylenically unsaturated monomer is in the form of a suspension added to the petroleum hydrocarbon aqueous dispersion medium.

In the embodiment, the reversed phase suspension polymerization method is preferable from the viewpoint that the polymerization reaction can be accurately controlled and a wide range of particle size can be controlled. Hereinafter, as an example of the embodiment of the invention, the water-absorbent resin production apparatus 1 for producing a water-absorbent resin using a reversed phase suspension polymerization method will be described.

The water-absorbent resin production apparatus 1 includes, for example, a polymerization reactor 2, a dryer 3, a powder flow rate regulating discharge member 4, and a classifier 6.

In the polymerization reactor 2, a water-soluble ethylenically unsaturated monomer is polymerized in a liquid medium to obtain a water-absorbent resin composition R1 (a suspension of the water-containing gel polymer R2) containing a water-containing gel polymer R2 of a water-absorbent resin which is a polymer of the water-soluble ethylenically unsaturated monomer, and the liquid medium. The polymerization reactor 2 includes a reactor main body 2a in which the polymerization reaction of the water-soluble ethylenically unsaturated monomer is performed. The reactor main body 2a is provided with a resin composition outflow opening portion 2b. In the polymerization reactor 2, the water-absorbent resin composition R1 which is obtained by the polymerization reaction in the reactor main body 2a flows out from the reactor main body 2a through the resin composition outflow opening portion 2b.

Examples of a material forming the polymerization reactor 2 include copper, a titanium alloy, and stainless steel such as SUS304, SUS316, or SUS316L. From the viewpoint of suppressing adhesion of the produced water-absorbent resin, it is preferable that a surface processing such as a fluororesin processing is applied to an inner wall surface.

Examples of the water-soluble ethylenically unsaturated monomer which is used as a material of the water-absorbent resin include: a monomer having an acid group such as (meth)acrylic acid ("(meth)acryl" represents both "acryl" and "methacryl"; hereinafter, the same shall be applied), 2-(meth)acrylamide-2-methylpropane sulfonic acid, or maleic acid, and a salt thereof; a nonionic unsaturated monomer such as (meth)acrylamide, N,N-dimethyl(meth)acrylamide, 2-hydroxyethyl(meth)acrylate, or N-methylol (meth)acrylamide; an amino group-containing unsaturated monomer such as diethylaminoethyl(meth)acrylate or diethylaminopropyl(meth)acrylate, and a quaternized product thereof. Among these, one kind may be used alone, or a mixture of two or more kinds may be used.

Examples of an alkaline compound used in a case where the monomer having an acid group is neutralized to form a salt include compounds of lithium, sodium, potassium, ammonium, and the like. Specific examples include sodium hydroxide, potassium hydroxide, lithium hydroxide, sodium carbonate, and ammonium carbonate.

Among the examples of the water-soluble ethylenically unsaturated monomer, (meth)acrylic acid or a salt thereof is preferable from the viewpoint of easy industrial availability.

In a case where the monomer having an acid group is neutralized, the degree of neutralization is preferably 30 to 90 mol % with respect to the acid group of the water-soluble ethylenically unsaturated monomer. It is not preferable that the degree of neutralization is lower than 30 mol % because the acid group is unlikely to be ionized and the water absorption capacity is likely to decrease. It is not preferable that the degree of neutralization is higher than 90 mol %, there may be a problem in safety or the like for use as a hygiene product.

In the embodiment, the water-soluble ethylenically unsaturated monomer is used in the form of an aqueous solution. The monomer concentration in the water-soluble ethylenically unsaturated monomer aqueous solution is preferably 20 mass % to a saturated concentration.

The water-soluble ethylenically unsaturated monomer aqueous solution may include a chain transfer agent, a thickener and the like as necessary. Examples of the chain transfer agent include compounds such as thiols, thiol acids, secondary alcohols, hypophosphorous acid, or phosphorous acid. Among these, one kind may be used alone, or a combination of two or more kinds may be used. Examples of the thickener include carboxymethyl cellulose, hydroxyethyl cellulose, hydroxypropyl cellulose, methyl cellulose, polyethylene glycol, polyacrylic acid, polyacrylic acid neutralized products, and polyacrylamide.

Examples of the petroleum hydrocarbon aqueous dispersion medium as a liquid medium include: an aliphatic hydrocarbon having 6 to 8 carbon atoms such as n-hexane, n-heptane, 2-methyl hexane, 3-methyl hexane, 2,3-dimethyl pentane, 3-ethyl pentane, or n-octane; an alicyclic hydrocarbon such as cyclohexane, methylcyclohexane, cyclopentane, methyl cyclopentane, trans-1,2-dimethylcyclopentane, cis-1,3-dimethylcyclopentane, or trans-1,3-dimethylcyclopentane; and an aromatic hydrocarbon such as benzene, toluene, or xylene. Among these, from the viewpoints of easy industrial availability and safety, an aliphatic hydrocarbon having 6 to 8 carbon atoms such as n-hexane, n-heptane, 2-methyl hexane, 3-methyl hexane, or n-octane; or an alicyclic hydrocarbon having 6 to 8 carbon atoms such as cyclohexane, methyl cyclopentane, or methylcyclohexane is more preferably used. Among these petroleum hydrocarbon aqueous dispersion media, one kind may be used alone, or a combination of two or more kinds may be used.

Further, among these petroleum hydrocarbon aqueous dispersion media, from the viewpoints that the reversed phase suspension state is better, a preferable particle size is likely to be obtained, it is easily industrially available, and the quality is stable, n-heptane or cyclohexane is preferably used. In addition, as an example of the mixture of hydrocarbon, even in a case where commercially available EXXSOL HEPTANE (manufactured by Exxon Mobil Corporation; containing 75% to 85% of hydrocarbon of n-heptane and isomer) is used, preferable results are obtained.

From the viewpoint of uniformly dispersing the water-soluble ethylenically unsaturated monomer aqueous solution and easily controlling the polymerization temperature, typically, the amount of the petroleum hydrocarbon aqueous dispersion medium used is preferably 50 to 600 parts by mass, more preferably 50 to 400 parts by mass, and still more preferably 50 to 200 parts by mass with respect to 100 parts by mass of the water-soluble ethylenically unsaturated monomer aqueous solution.

In the reversed phase suspension polymerization, a surfactant and, as necessary, a hydrophobic polymeric dispersant are used in order to disperse the water-soluble ethylenically unsaturated monomer aqueous solution in the petroleum hydrocarbon aqueous dispersion medium to obtain more stable polymerized particles. From the viewpoint of stably completing the polymerization, the timing at which the surfactant and the hydrophobic polymeric dispersant are added is not particularly limited as long as the polymerization can be performed after causing them to be present before the polymerization of the water-soluble ethylenically unsaturated monomer aqueous solution so as to sufficiently disperse the water-soluble ethylenically unsaturated monomer aqueous solution in the petroleum hydrocarbon aqueous dispersion medium such that the droplets of the dispersion are stabilized. In general, the surfactant and the hydrophobic polymeric dispersant are dissolved or dispersed in the petroleum hydrocarbon aqueous dispersion medium in advance before the addition of the water-soluble ethylenically unsaturated monomer aqueous solution.

Examples of the surfactant used to maintain the dispersion stability during the polymerization include: a nonionic surfactant such as sorbitan fatty acid ester, polyoxyethylene sorbitan fatty acid ester, polyglycerin fatty acid ester, polyoxyethylene glycerin fatty acid ester, sucrose fatty acid ester, sorbitol fatty acid ester, polyoxyethylene sorbitol fatty acid ester, polyoxyethylene alkyl ether, polyoxyethylene alkyl phenyl ether, polyoxyethylene castor oil, polyoxyethylene hydrogenated castor oil, alkyl allyl formaldehyde condensed polyoxyethylene ether, polyoxyethylene polyoxypropyl alkyl ether, polyethylene glycol fatty acid ester, alkyl glucoside, N-alkyl gluconamide, polyoxyethylene fatty acid amide, and polyoxyethylene alkyl amine; and an anionic surfactant such as a fatty acid salt, alkyl benzene sulfonate, alkyl methyl taurate, polyoxyethylene alkyl phenyl ether sulfate, polyoxyethylene alkyl ether sulfate, a polyoxyethylene alkyl ether sulfonic acid and a salt thereof, a polyoxyethylene alkyl phenyl ether phosphoric acid and a salt thereof, and a polyoxyethylene alkyl ether phosphoric acid and a salt thereof. Among these, one kind may be used alone, or a mixture of two or more kinds may be used.

Among these surfactants, from the viewpoint of the dispersion stability of the monomer aqueous solution, at least one selected from the group consisting of polyglycerin fatty acid ester, sucrose fatty acid ester, and sorbitan fatty acid ester is preferable.

The additive amount of the surfactant used is preferably 0.01 to 5 parts by mass and more preferably 0.05 to 3 parts by mass with respect to 100 parts by mass of the water-soluble ethylenically unsaturated monomer aqueous solution. It isnot preferable that the additive amount of the surfactant is less than 0.01 part by mass because the dispersion stability of the water-soluble ethylenically unsaturated monomer aqueous solution decreases. It is not preferable that the additive amount of the surfactant is more than 5 parts by mass because there is an economical disadvantage.

In order to further improve the dispersion stability during the polymerization, the hydrophobic polymeric dispersant may be used in combination with the surfactant. As the hydrophobic polymeric dispersant, a dispersant which can be dispersed or dissolved in the petroleum hydrocarbon aqueous dispersion medium used is preferably selected and used. For example, the viscosity average molecular weight of the hydrophobic polymeric dispersant is 20000 or less, preferably 10000 or lower, and more preferably 5000 or less. Specific examples of the hydrophobic polymeric dispersant include maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, an oxidized ethylene-propylene copolymer, an ethylene-acrylic acid copolymer, ethyl cellulose, maleic anhydride-modified polybutadiene, and maleic anhydride-modified EPDM (ethylene/propylene/diene terpolymer).

Among these, at least one selected from the group consisting of maleic anhydride-modified polyethylene, maleic anhydride-modified polypropylene, a maleic anhydride-modified ethylene-propylene copolymer, a maleic anhydride-ethylene copolymer, a maleic anhydride-propylene copolymer, a maleic anhydride-ethylene-propylene copolymer, polyethylene, polypropylene, an ethylene-propylene copolymer, oxidized polyethylene, oxidized polypropylene, and an oxidized ethylene-propylene copolymer is preferable.

The additive amount of the hydrophobic polymeric dispersant is preferably 0 to 5 parts by mass, more preferably 0.01 to 3 parts by mass, and still more preferably 0.05 to 2 parts by mass with respect to 100 parts by mass of the water-soluble ethylenically unsaturated monomer aqueous solution. It is not preferable that the additive amount of the hydrophobic polymeric dispersant is more than 5 parts by mass because there is no economical advantage.

In a case where the water-soluble ethylenically unsaturated monomer aqueous solution is added to and dispersed in the petroleum hydrocarbon aqueous dispersion medium which is filled in the polymerization reactor 2 in advance, the water-soluble ethylenically unsaturated monomer aqueous solution is dispersed using stirring means 2c. In this case, conditions of stirring using the stirring means 2c vary depending on a desired diameter of dispersion droplets and thus cannot be unconditionally determined. The diameter of the dispersion droplets can be adjusted by selecting the kind, diameter, and rotating speed of a stirring blade in the stirring means 2c. As the stirring blade, for example, a propeller blade, a paddle blade, an anchor blade, a turbine blade, a PFAUDLER blade, a ribbon blade, a FULLZONE blade (manufactured by Shinko Pantec Kabushiki Kaisha), a MAXBLEND blade (manufactured by Sumitomo Heavy Industries, Ltd.), or a SUPER-MIX (manufactured by Satake Chemical Equipment Mfg., Ltd.) can be used.

In the reactor main body 2a of the polymerization reactor 2, the water-soluble ethylenically unsaturated monomer aqueous solution, which is added to the petroleum hydrocarbon aqueous dispersion medium at a predetermined addition rate, is sufficiently stirred by the stirring means 2c in the petroleum hydrocarbon aqueous dispersion medium in the presence of the surfactant such that the droplets of the dispersion are stabilized. The inside of the reactor main body 2a of the polymerization reactor 2 is sufficiently purged with nitrogen. Next, the reversed phase suspension polymerization is performed using a water-soluble radical polymerization initiator, as necessary in the presence of an internal crosslinking agent, to obtain the water-absorbent resin composition R1 as the suspension of the water-containing gel polymer R2.

Examples of the water-soluble radical polymerization initiator used in the embodiment include: a persulfate such as potassium persulfate, ammonium persulfate, or sodium persulfate; a peroxide such as hydrogen peroxide; and an azo compound such as 2,2'-azobis (2-amidinopropane) dihydrochloride, 2,2'-azobis [N-(2-carboxyethyl)-2-methylpropiondiamine]tetrahydrate, 2,2'-azobis (1-imino-1-pyrrolidino-2-methylpropane) dihydrochloride, or 2,2'-azobis[2-methyl-N-(2-hydroxyethyl)-propionamide].

Among these, from the viewpoints of easy availability and easy handleability, potassium persulfate, ammonium persulfate, sodium persulfate, or 2,2'-azobis (2-amidinopropane) dihydrochloride is preferable.

The water-soluble radical polymerization initiator may be used in combination with a reducing agent such as sulfite or ascorbic acid to function as a redox polymerization initiator.

Typically, the amount of the water-soluble radical polymerization initiator used is 0.01 to 1 part by mass with respect to 100 parts by mass of the water-soluble ethylenically unsaturated monomer. It is not preferable that the amount of the water-soluble radical polymerization initiator used is less than 0.01 part by mass because the polymerization degree decreases. It is not preferable that the amount of the water-soluble radical polymerization initiator used is more than 1 part by mass because the polymerization reaction rapidly occurs.

The timing at which the water-soluble radical polymerization initiator is added is not particularly limited, and it is preferable that the water-soluble ethylenically unsaturated monomer aqueous solution is added in advance.

Examples of the internal crosslinking agent which is used as necessary include: a polyol such as (poly)ethylene glycol ["(poly)" represents both the cases where the prefix "poly" is present and absent; hereinafter, the same shall be applied], 1,4-butanediol, glycerin, or trimethylolpropane; an unsaturated polyester containing two or more vinyl groups which is obtained by causing a polyol to react with an unsaturated acid such as acrylic acid or methacrylic acid; a bisacrylamide such as N,N'-methylenebisacrylamide; and a polyglycidyl compound containing two or more glycidyl groups such as (poly)ethylene glycol diglycidyl ether, (poly)ethylene glycol triglycidyl ether, (poly)glycerin diglycidyl ether, (poly) glycerin triglycidyl ether, (poly)propylene glycol polyglycidyl ether, or (poly)glycerol polyglycidyl ether. Among these, one kind may be used alone, or a combination of two or more kinds may be used.

The additive amount of the internal crosslinking agent is preferably 0 to 3 parts by mass, more preferably 0 to 1 part by mass, and still more preferably 0.001 to 0.1 part by mass with respect to 100 parts by mass of the water-soluble ethylenically unsaturated monomer. It is not preferable that the additive amount is more than 3 parts by mass because the crosslinking becomes excessive and the water absorption performance becomes excessively low. It is preferable that the internal crosslinking agent is added to the water-soluble ethylenically unsaturated monomer aqueous solution in advance.

The reaction temperature during the reversed phase suspension polymerization in the polymerization reactor 2 varies depending on the kind and amount of the polymerization initiator used and thus cannot be unconditionally determined. The reaction temperature is preferably 30° C. to 120° C. and more preferably 40° C. to 100° C. It is not preferable that the reaction temperature is lower than 30° C. because the polymerization degree may decrease. In addition, it is not preferable that the reaction temperature is higher than 120° C. because the polymerization reaction rapidly occurs.

"A multi-stage polymerization" may be performed by polymerizing the water-absorbent resin composition R1 (the suspension of the water-containing gel polymer R2) containing the water-containing gel polymer R2, which is obtained as described above, in the first stage and repeating the addition and polymerization of the water-soluble ethylenically unsaturated monomer aqueous solution several times in the subsequent stages. In particular, for use as hygiene products, it is preferable that a two-stage polymerization is performed from the viewpoint of the size of particles of the obtained water-absorbent resin and the production efficiency. Hereinafter, the multi-stage polymerization will be described by using the two-stage polymerization as an example.

From the viewpoint of obtaining an appropriate size of agglomerated particles in the multi-stage polymerization, regarding the size of particles obtained by polymerization of the water-soluble ethylenically unsaturated monomer in the first stage, the median particle size is preferably 20 to 200 μm, more preferably 30 to 150 μm, and still more preferably 40 to 120 μm.

The median particle size of polymerized particles in the first stage can be measured using the following method, the polymerized particles being obtained by performing dehydration and drying after the completion of the first-stage polymerization. That is, JIS standard sieves including a sieve having an opening of 425 μm, a sieve having an opening of 250 μm, a sieve having an opening of 180 μm, a sieve having an opening of 150 μm, a sieve having an opening of 106 μm, a sieve having an opening of 75 μm, and a sieve having an opening of 45 μm in this order are combined with a receiver. Into the uppermost sieve of the combination, 50 g of the dry polymerized particles are put and are classified by shaking the sieves using a Ro-tap shaker for 20 minutes. After the classification, the masses of polymerized particles remaining on the respective sieves are calculated as the mass percentages with respect to the total mass of all the particles and are integrated in order from the largest particle size to the smallest particle size. As a result, a relationship between the opening size of each of the sieves and the mass percentage of the polymerized particles remaining on the sieve is plotted on a logarithmic probability paper. By connecting the plots on the logarithmic probability paper with a straight line, a particle size corresponding to 50 mass % with respect to the integrated mass percentage can be obtained as the median particle size of the polymerized particles.

By performing the two-stage polymerization using a method described below, particles obtained by the first-stage polymerization are caused to agglomerate, and a water-absorbent resin having a relatively large average particle size, which is suitable for use as hygiene products, can be obtained.

At this time, it is necessary to reduce the action of the surfactant so that the water-soluble ethylenically unsaturated monomer aqueous solution used in the second-stage polymerization does not form individual liquid droplets. For example, the water-soluble ethylenically unsaturated monomer aqueous solution of the second-stage polymerization is added at a temperature at which at least a part of the surfactant precipitates due to cooling which is performed after the first-stage polymerization. As a result, the agglomerated particles can be obtained.

The above-described method is not particularly limited as long as it is a method of obtaining the agglomerated particles by the addition of the water-soluble ethylenically unsaturated monomer aqueous solution of the second-stage polymerization.

In addition, by adding the water-soluble ethylenically unsaturated monomer aqueous solution of the second-stage polymerization after reducing the action of the surfactant as described above, the amount of the petroleum hydrocarbon aqueous dispersion medium remaining in the water-absorbent resin can be further reduced.

As the water-soluble ethylenically unsaturated monomer of the second-stage polymerization, the same examples of the water-soluble ethylenically unsaturated monomer of the first-stage polymerization described above can be used. The kind of the monomer, the degree of neutralization, the neutral salt, and the monomer concentration in the aqueous solution may be the same as or different from those of the water-soluble ethylenically unsaturated monomer of the first-stage polymerization.

As a polymerization initiator added to the water-soluble ethylenically unsaturated monomer aqueous solution of the second-stage polymerization, a polymerization initiator can be selected and used from the examples of the polymerization initiator added to the water-soluble ethylenically unsaturated monomer aqueous solution of the first-stage polymerization.

In addition, as necessary, an internal crosslinking agent, a chain transfer agent, and the like may be added to the water-soluble ethylenically unsaturated monomer aqueous solution of the second-stage polymerization. At this time, the internal crosslinking agent, the chain transfer agent, and the like can be selected and used from the examples of the internal crosslinking agent, the chain transfer agent, and the like added to the water-soluble ethylenically unsaturated monomer aqueous solution of the first-stage polymerization.

From the viewpoint of obtaining appropriate agglomerated particles, the additive amount of the water-soluble ethylenically unsaturated monomer of the second-stage polymerization with respect to 100 parts by mass of the water-soluble ethylenically unsaturated monomer of the first-stage polymerization is preferably 50 to 300 parts by mass, more preferably 100 to 200 parts by mass, and still more preferably 120 to 160 parts by mass.

In the reversed phase suspension polymerization of the second stage, the stirring using the stirring means 2c is not particularly limited as long as all the components are uniformly mixed with each other. The particle size of the agglomerated particles can vary depending on the precipitation state of the surfactant and the like. The particle size of the agglomerated particles of the water-absorbent resin which is preferable for use as hygiene products is preferably 200 to 600 μm, more preferably 250 to 500 μm, and still more preferably 300 to 450 μm.

The particle size of the agglomerated particles corresponds to the median particle size of the water-absorbent resin powder R3, and can be measured using the following method, the agglomerated particles being obtained by performing dehydration and drying after the completion of the second-stage polymerization. That is, JIS standard sieves including a sieve having an opening of 850 μm, a sieve having an opening of 600 μm, a sieve having an opening of 500 μm, a sieve having an opening of 425 μm, a sieve having an opening of 300 μm, a sieve having an opening of 250 μm, and a sieve having an opening of 150 μm in this order are combined with a receiver. Into the uppermost sieve of the combination, 50 g of the dry agglomerated particles are put and are classified by shaking the sieves using a Ro-tap shaker for 20 minutes. After the classification, the masses of agglomerated particles remaining on the respective sieves are calculated as the mass percentages with respect to the total mass of all the particles and are integrated in order from the largest particle size to the smallest particle size. As a result, a relationship between the opening sizes of the sieves and the integrated value of the mass percentages of the agglomerated particles remaining on the sieves is plotted on a logarithmic probability paper. By connecting the plots on the logarithmic probability paper with a straight line, a particle size corresponding to 50 mass % with respect to the integrated mass percentage can be obtained as the median particle size of the agglomerated particles (the median particle size of the water-absorbent resin powder R3).

The reaction temperature during the reversed phase suspension polymerization of the second stage also varies depending on the kind and amount of the polymerization initiator and thus cannot be unconditionally determined. The reaction temperature is preferably 30° C. to 120° C. and more preferably 40° C. to 100° C. In a case where a multi-stage polymerization including two or more stages is performed, the description of the second-stage polymerization can be regarded as that of a third polymerization or a fourth polymerization.

The bottom of the reactor main body 2a of the polymerization reactor 2 is provided with a resin composition outflow opening portion 2b, through which the water-absorbent resin composition R1 containing the water-containing gel polymer R2 flows out from the reactor main body 2a after the polymerization reaction. The water-absorbent resin composition R1 which flows out from the reactor main body 2a through the resin composition outflow opening portion 2b flows into the dryer 3.

In the water-absorbent resin production apparatus 1, a concentrator (not schematically shown) may be disposed between the polymerization reactor 2 and the dryer 3. In a case where the concentrator is provided, the water-absorbent resin composition R1 which flows out from the reactor main body 2a of the polymerization reactor 2 flows into the dryer 3 through the concentrator.

The concentrator removes liquid components from the water-absorbent resin composition R1 by distillation. Examples of a material forming the concentrator include copper, a titanium alloy, and stainless steel such as SUS304, SUS316, or SUS316L. From the viewpoint of suppressing adhesion of the water-containing gel polymer R2, it is preferable that a surface processing such as a fluororesin processing is applied to an inner wall surface.

The removal by distillation of the liquid components from the water-absorbent resin composition R1 in the concentrator may be performed under normal pressure or under reduced pressure, and may be performed under gas flow such as nitrogen in order to improve the distillation efficiency of the liquid components. In addition, stirring means is disposed in the concentrator, and the removal by distillation of the liquid components from the water-absorbent resin composition R1 is performed while stirring the water-absorbent resin composition R1 using the stirring means.

In a case where the removal by distillation in the concentrator is performed under normal pressure, the set temperature of the concentrator is preferably 70° C. to 250° C., more preferably 80° C. to 180° C., still more preferably 80° C. to 140° C., and even still more preferably 90° C. to 130° C. In a case where the removal by distillation in the concentrator is performed under reduced pressure, the set temperature of the concentrator is preferably 60° C. to 100° C. and more preferably 70° C. to 90° C.

In addition, for example, it is preferable that a post-crosslinking agent (surface crosslinking agent) having two or more functional groups which are reactive with a functional group derived from the water-soluble ethylenically unsaturated monomer is added during the removal by distillation of the liquid components from the water-absorbent resin composition R1 in the concentrator. By adding the crosslinking agent to cause a reaction after the polymerization, the crosslinking density of surface layers of the water-absorbent resin particles is increased, various performances such as water absorption capacity under pressure, water absorption capacity (water absorption rate), or gel strength can be improved, and performances which are preferable for use as hygiene products are imparted.

The post-crosslinking agent used in the above-described crosslinking reaction is not particularly limited as long as it is reactive with a functional group derived from the water-soluble ethylenically unsaturated monomer used for the polymerization.

Examples of the post-crosslinking agent used include: a polyol such as ethylene glycol, propylene glycol, 1,4-butanediol, trimethylolpropane, glycerin, polyoxyethylene glycol, polyoxypropylene glycol, or polyglycerin; a polyglycidyl compound such as (poly)ethylene glycol diglycidyl ether, (poly)ethylene glycol triglycidyl ether, (poly)glycerin diglycidyl ether, (poly) glycerin triglycidyl ether, (poly) propylene glycol polyglycidyl ether, or (poly)glycerol polyglycidyl ether; a halo epoxy compound such as epichlorohydrin, epibromohydrin, or α-methylepichlorohydrin; a compound containing two or more reactive functional groups, for example, an isocyanate compound such as 2,4-tolylene diisocyanate or hexamethylene diisocyanate; an oxetane compound such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, or 3-butyl-3-oxetane ethanol; an oxazoline compound such as 1,2-ethylenebisoxazoline; and a carbonate compound such as ethylene carbonate. Among these, one kind may be used alone, or a mixture of two or more kinds may be used.

Among these, from the viewpoint of high reactivity, a polyglycidyl compound such as (poly)ethylene glycol diglycidyl ether, (poly)ethylene glycol triglycidyl ether, (poly) glycerin diglycidyl ether, (poly) glycerin triglycidyl ether, (poly)propylene glycol polyglycidyl ether, or (poly)glycerol polyglycidyl ether is preferable.

The additive amount of the post-crosslinking agent is preferably 0.01 to 5 parts by mass and more preferably 0.02 to 3 parts by mass with respect to 100 parts by mass of the total mass of the water-soluble ethylenically unsaturated monomer provided for the polymerization. It is not preferable that the additive amount of the post-crosslinking agent is less than 0.01 part by mass because various performances of the obtained water-absorbent resin such as water absorption capacity under pressure, water absorption capacity, water absorption rate, or gel strength cannot be improved. It is not preferable that the additive amount of the post-crosslinking agent is more than 5 parts by mass because the water absorption capacity becomes excessively low.

Further, regarding a method of adding the post-crosslinking agent, the post-crosslinking agent may be added as it is or in the form of an aqueous solution. If needed, the post-crosslinking agent may be added in the form of a solution in which a hydrophilic organic solvent is used as a solvent. Examples of the hydrophilic organic solvent include: a lower alcohol such as methyl alcohol, ethyl alcohol, n-propyl alcohol, isopropyl alcohol, and propylene glycol; a ketone such as acetone and methyl ethyl ketone; an ether such as diethyl ether, dioxane, and tetrahydrofuran; an amide such as N,N-dimethylformamide; and a sulfoxide such as dimethyl sulfoxide. Among these hydrophilic organic solvents, one kind may be used alone, or a combination of two or more kinds may be used.

The timing at which the post-crosslinking agent is added is not particularly limited as long as it is after the polymerization. During the removal by distillation of the liquid components from the water-absorbent resin composition R1 in the concentrator, the post-crosslinking reaction is preferably performed in the presence of 1 to 200 parts by mass of water, preferably performed in the presence of 5 to 100 parts by mass of water, and still more preferably performed in the presence of 10 to 50 parts by mass of water with respect to 100 parts by mass of the water-absorbent resin. By adjusting the water content as described above during the addition of the post-crosslinking agent, the post-crosslinking reaction on the surface layers of the water-absorbent resin particles can be performed more favorably, and better water absorption performance can be exhibited.

The temperature during the post-crosslinking reaction is preferably 50° C. to 250° C., more preferably 60° C. to 180° C., still more preferably 60° C. to 140° C., and even still more preferably 70° C. to 120° C.

In addition, in a case where the removal by distillation in the concentrator is performed under normal pressure, dehydration can be promoted by circulating only the petroleum hydrocarbon aqueous dispersion medium among the liquid components which are distilled out of the system by azeotropy.

Hereinafter, a configuration of the water-absorbent resin production apparatus 1 not including the concentrator will be described.

The resin composition outflow opening portion 2b of the polymerization reactor 2 and the dryer 3 are connected through a resin composition flow path pipe 11 which is the resin composition flow path member. The resin composition flow path pipe 11 is, for example, cylindrical, one end portion thereof is connected to the resin composition outflow opening portion 2b, and the other end portion is connected to the dryer 3 such that the water-absorbent resin composition R1 which flows out from the resin composition outflow opening portion 2b passes through the resin composition flow path pipe 11.

The resin composition flow path pipe 11 is provided with a resin composition flow path opening-closing valve 11a which opens and closes the flow path in the pipe. In a state where the resin composition flow path opening-closing valve 11a is opened, the water-absorbent resin composition R1 containing the water-containing gel polymer R2, which flows out from the reactor main body 2a through the resin composition outflow opening portion 2b, passes through the inside of the resin composition flow path pipe 11 and flows into the dryer 3.

The dryer 3 is an apparatus for drying the water-absorbent resin composition R1 to obtain the particulate water-absorbent resin powder R3, and includes a dryer main body 3a in which the water-absorbent resin composition R1 is dried. The dryer main body 3a is provided with a resin composition inflow opening portion 3b which is connected to the other end portion of the resin composition flow path pipe 11, and a powder outflow opening portion 3c. In the dryer 3, the water-absorbent resin composition R1 which passes through the inside of the resin composition flow path pipe 11 flows into the dryer main body 3a through the resin composition inflow opening portion 3b, and the water-absorbent resin powder R3 which is obtained by drying the water-absorbent resin composition R1 in the dryer main body 3a flows out from the dryer main body 3a through the powder outflow opening portion 3c.

In the dryer 3, the water-absorbent resin composition R1 is heated such that the water content in the dryer main body 3a is preferably 20 mass % or lower and more preferably 10 mass % or lower. As a result, the dry water-absorbent resin powder R3 is obtained. In order to improve various properties such as flowability, various additives such as amorphous silica powder may be added to the water-absorbent resin powder R3 obtained in the dryer 3.

In addition, the above-described post-crosslinking agent (surface crosslinking agent) having two or more functional groups which are reactive with a functional group derived from the water-soluble ethylenically unsaturated monomer may be added during the drying of the water-absorbent resin composition R1 in the dryer main body 3a of the dryer 3. By adding the crosslinking agent to cause a reaction after the polymerization, the crosslinking density of surface layers of the water-absorbent resin particles as the water-absorbent resin powder R3 is increased, various performances such as water absorption capacity under pressure, water absorption capacity, water absorption rate, or gel strength can be improved, and performances which are preferable for use as hygiene products are imparted.

The water-absorbent resin powder R3 which flows out from the dryer main body 3a through the powder outflow opening portion 3c in the dryer 3 flows into the powder flow rate regulating discharge member 4.

The powder outflow opening portion 3c of the dryer 3 and the powder flow rate regulating discharge member 4 are connected through, for example, a first powder flow path pipe 12 which is a cylindrical powder flow path member. In the first powder flow path pipe 12, one end portion is connected to the powder outflow opening portion 3c, and the other end portion is connected to the powder flow rate regulating discharge member 4 such that the water-absorbent resin powder R3 which flows out from the powder outflow opening portion 3c passes through the first powder flow path pipe 12.

In the embodiment, the first powder flow path pipe 12 is formed in a rectangular tubular shape extending in a vertical direction from one end portion of the first powder flow path pipe 12, which is connected to the powder outflow opening portion 3c, to the other end portion of the first powder flow path pipe 12, corresponding to a rectangular shape in which the powder outflow opening portion 3c of the dryer 3 is formed. In addition, on a wall portion of the first powder flow path pipe 12 opposite to a wall portion connected to the powder outflow opening portion 3c, a powder aggregate extracting opening portion 12a for extracting a powder aggregate R4 which is collected by a collector 5 described below, from the first powder flow path pipe 12 is disposed downstream of the powder outflow opening portion 3c in the passing direction of the water-absorbent resin powder R3. Further, the first powder flow path pipe 12 is provided with a lid portion 12b for opening and closing the powder aggregate extracting opening portion 12a.

As shown in FIG. 2, in the first powder flow path pipe 12, the collector 5 is disposed such that an outer peripheral edge thereof is in contact with an inner surface of the first powder flow path pipe 12. The collector 5 collects the powder aggregate R4 which is an aggregate of the water-absorbent resin powder R3 and whose size is greater than a predetermined size, from the water-absorbent resin powder R3 which is passing through the inside of the first powder flow path pipe 12, and allows the water-absorbent resin powder R3 other than the powder aggregate R4 to pass through.

Here, the powder aggregate R4 collected by the collector 5 is an aggregate obtained by growth of an adhered material as a core, the adhered material being obtained by adhesion of the water-absorbent resin as a polymer of the water-soluble ethylenically unsaturated monomer on, for example, an inner wall surface of the reactor main body 2a of the polymerization reactor 2 and on an inner wall surface of the dryer main body 3a of the dryer 3, or an aggregate of the water-absorbent resin powder R3. In this case, the properties (for example, water absorption capacity under pressure or water absorption capacity) as the water-absorbent resin are likely to be poor.

Figure 6:
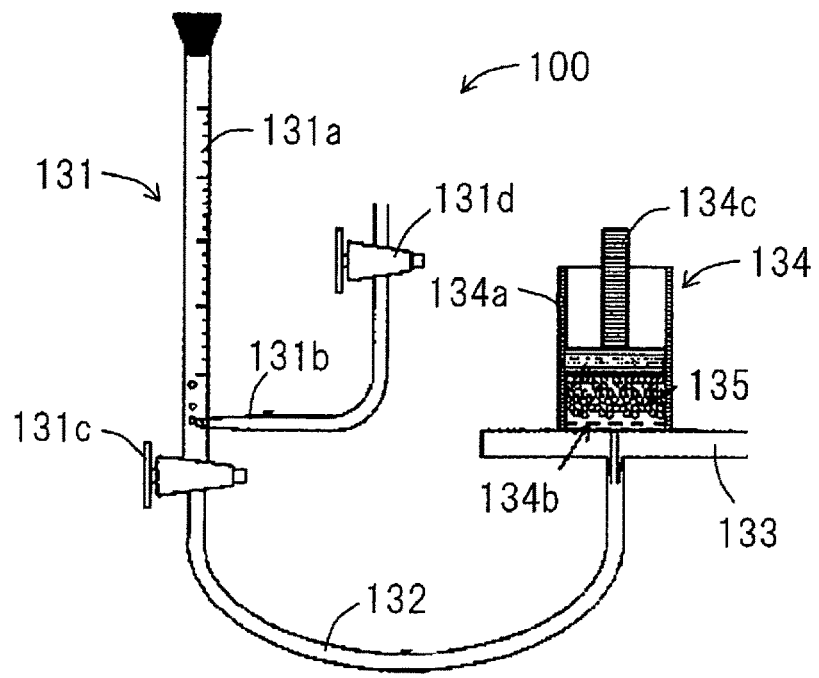
FIG. 6 is a schematic diagram showing a configuration of a measuring device 100 used to evaluate a water absorption capacity under pressure.

The water absorption capacity under pressure which is a property as the water-absorbent resin can be measured using a measuring device 100 schematically shown in FIG. 6. The measuring device 100 shown in FIG. 6 includes a burette portion 131, a conduit 132, a measuring stand 133, and a measuring portion 134 disposed on the measuring stand 133. In the burette portion 131, a rubber stopper is connected to the top of a burette 131a, and an air introduction tube 131b and a cock 131c are connected to the bottom of the burette 131a. Further, a cock 131d is disposed at a distal end of the air introduction tube 131b. The conduit 132 is attached between the burette portion 131 and the measuring stand 133, and the inner diameter of the conduit 132 is 6 mm. A hole having a diameter of 2 mm is formed at the center of the measuring stand 133, and the conduit 132 is connected thereto. The measuring portion 134 includes: a cylindrical portion 134*a* (formed of PLEXIGLAS), a nylon mesh 134*b* adhering to the bottom of the cylindrical portion 134*a*, and a weight 134*c*. The inner diameter of the cylindrical portion 134*a* is 20 mm. The nylon mesh 134*b* has an opening of 75 μm (200 mesh). During the measurement, the water-absorbent resin 135 is uniformly spread over the nylon mesh 134*b*. The weight 134*c* has a diameter of 19 mm and a mass of 119.6 g. The weight 134*c* is placed on the water-absorbent resin 135 such that a load of 4.14 kPa can be applied to the water-absorbent resin 135.

Next, the measurement procedure will be described. The measurement is performed in a room at 25° C. First, the cocks 131*c* and 131*d* of the burette portion 131 are closed, 0.9 mass % salt solution adjusted to 25° C. is put through the top of the burette 131*a*, the top of the burette 131*a* is sealed with the rubber stopper, and then the cocks 131*c* and 131*d* of the burette portion 131 are opened. Next, the height of the measuring stand 133 is adjusted such that the water surface of the 0.9 mass % salt solution which flows out from the conduit hole at the center of the measuring stand 133 has the same height as the top surface of the measuring stand 133.

Separately, 0.10 g of the water-absorbent resin 135 is uniformly spread over the nylon mesh 134*b* of the cylindrical portion 134*a*, and the weight 134*c* is placed on the water-absorbent resin 135. As a result, the measuring portion 134 is prepared. Next, the measuring portion 134 is placed such that the center thereof matches with a conduit hole at the center of the measuring stand 133.

Once the water-absorbent resin 135 starts to absorb water, a reduction of the 0.9 mass % salt solution in the burette 131*a* (that is, the amount of the 0.9 mass % salt solution absorbed by the water-absorbent resin 135) Wc (ml) is read. The water absorption capacity under pressure of the water-absorbent resin 135 measured 60 minutes after the start of the water absorption can be obtained from the following Expression (1).

$$\text{Water Absorption Capacity under Pressure (ml/g)} = Wc/0.10 \quad (1)$$

In a case where the water-absorbent resin 135 is formed of the water-absorbent resin powder R3, the water absorption capacity under pressure of the water-absorbent resin 135 measured as described above is 12 to 30 ml/g. On the other hand, in a case where the water-absorbent resin 135 is formed of the powder aggregate R4, the water absorption capacity under pressure of the water-absorbent resin 135 measured as described above is 10 ml/g or lower.

In addition, the water absorption capacity which is a property as the water-absorbent resin can be measured as follows. That is, 500 g of 0.9 mass % salt solution is put into a 500 mL beaker, 2.0 g of the water-absorbent resin is added thereto, and the mixture is stirred for 60 minutes. A mass Wa (g) of a JIS standard sieve having an opening of 75 μm is measured in advance. The content of the beaker is filtered through this sieve. By leaving the sieve to stand in a state where it is tilted at a tilt angle of about 30 degrees with respect to the horizon for 30 minutes, the remaining water is removed by filtration. A mass Wb (g) of the sieve containing the water-absorbent gel is measured, and the water absorption capacity can be obtained from the following Expression (2).

$$\text{Water Absorption Capacity (g/g)} = (Wb - Wa)/2.0 \quad (2)$$

In a case where the water-absorbent resin is formed of the water-absorbent resin powder R3, the water absorption capacity of the water-absorbent resin measured as described above is 50 to 65 g/g. On the other hand, in a case where the water-absorbent resin is formed of the powder aggregate R4, the water absorption capacity of the water-absorbent resin measured as described above is 30 to 48 g/g.

In addition, from the viewpoint of the size, the powder aggregate R4 is defined as an aggregate which is the aggregate of the water-absorbent resin powder R3 and whose size is greater than a predetermined size. The predetermined size (hereinafter, referred to as "powder aggregate index size") which is an index for the size of the powder aggregate R4 is defined as a value obtained, on a basis of an upper limit value D1 (μm) of the median particle size of the water-absorbent resin powder R3, by multiplying the upper limit value D1 by 15, being obtained from the following Expression (3).

$$\text{Powder Aggregate Index Size (μm)} = D1 \times 15 \quad (3)$$

In the embodiment, the upper limit value D1 (μm) of the median particle size of the water-absorbent resin powder R3 is "600" μm as described above. Therefore, the powder aggregate index size calculated from Expression (3) is 9000 μm. That is, in the embodiment, an aggregate having a greater size than 9000 μm which is the powder aggregate index size is regarded as the powder aggregate R4.

Figure 3:
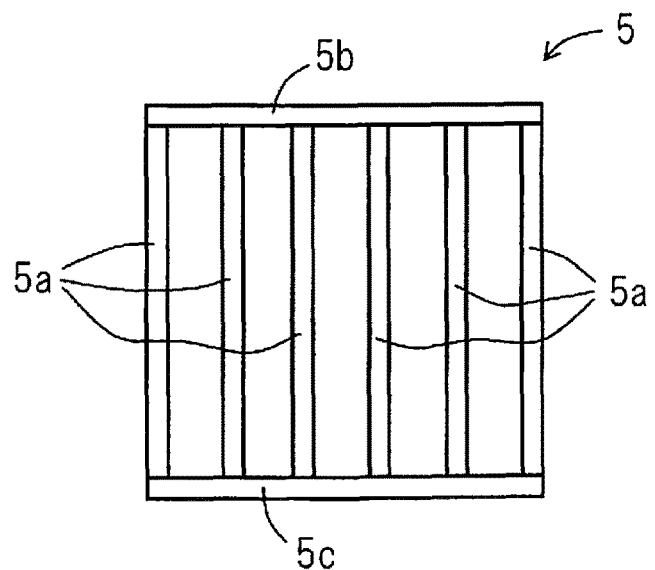
FIG. 3 is a schematic diagram showing a collector 5 as an example of a collector.

A configuration of the collector 5 which collects the powder aggregate R4 in the first powder flow path pipe 12 will be described in detail using FIG. 3. FIG. 3 is a schematic diagram showing the collector 5 as an example of the collector. In the embodiment, the collector 5 includes: a plurality of rod-shaped members 5*a* disposed parallel to each other at intervals which are greater than a size of the water-absorbent resin powder R3 which is passing through the inside of the first powder flow path pipe 12 and less than or equal to the powder aggregate index size of the powder aggregate R4; a rod-shaped first connecting member 5*b* which connects one end portions of the plurality of rod-shaped members 5*a*; and a rod-shaped second connecting member 5*c* which connects the other end portions of the plurality of rod-shaped members 5*a*. The intervals between the plurality of rod-shaped members 5*a* are equal to each other, and "the size of the water-absorbent resin powder R3" for defining a lower limit value of the intervals is the upper limit value of the median particle size of the water-absorbent resin powder R3.

The collector 5 including the plurality of rod-shaped members 5*a*, the first connecting member 5*b*, and the second connecting member 5*c* has a rectangular external shape as a whole corresponding to the rectangular tubular shape in which the first powder flow path pipe 12 is formed.

In the water-absorbent resin production apparatus 1 according to the embodiment, the collector 5 which collects the powder aggregate R4 is disposed in the first powder flow path pipe 12 through which the water-absorbent resin powder R3 passes. Therefore, the powder aggregate R4 can be prevented from flowing into the powder flow rate regulating discharge member 4 described below connected to the other end portion of the first powder flow path pipe 12 on the classifier side. As a result, the powder aggregate R4 is prevented from, for example, getting involved in a driving portion of the powder flow rate regulating discharge member 4, an increase in the drive load is suppressed, and the driving of the powder flow rate regulating discharge member 4 can be prevented from becoming unstable and stopping. Therefore, a decrease in the production efficiency of the water-absorbent resin can be suppressed. Accordingly, in the water-absorbent resin production apparatus 1, the water-absorbent resin as a particulate powder can be produced with high production efficiency in a state where the powder aggregate R4 is removed therefrom. In addition, in a case where the properties of the powder aggregate R4 as the water-absorbent resin are poor, this powder aggregate R4 can be removed by the collector 5. Therefore, a high-quality water-absorbent resin can be produced.

In addition, it is preferable that the plurality of rod-shaped members 5a constituting the collector 5 are tilted in the first powder flow path pipe 12 with respect to the horizon. Specifically, the plurality of rod-shaped members 5a constituting the collector 5 linearly extend so as to be vertically downward in the first powder flow path pipe 12 in a direction from a wall portion connected to the powder outflow opening portion 3c toward another wall portion opposite to the wall portion, and are connected to a vertical lower end portion of the powder aggregate extracting opening portion 12a.

As described above, the plurality of rod-shaped members 5a constituting the collector 5 are tilted with respect to the horizon. As a result, the powder aggregate R4 collected by the collector 5 can be collected on a downstream side in the tilting direction. Therefore, the entire portion of the collector 5 in the first powder flow path pipe 12 is suppressed from being blocked by the powder aggregate R4, and thus a flow path through which the water-absorbent resin powder R3 passes can be secured in the first powder flow path pipe 12.

In addition, it is preferable that the plurality of rod-shaped members 5a constituting the collector 5 are columnar or cylindrical members. As a result, as compared to a case where the rod-shaped members 5a are formed of, for example, a member having corners, the crushing of the powder aggregate R4, which may occur when colliding with the rod-shaped members 5a, can be suppressed. As a result, the crushed powder aggregate R4, whose properties as the water-absorbent resin are likely to be poor, can be suppressed from passing through the collector 5.

In addition, the plurality of rod-shaped members 5a constituting the collector 5 may linearly extend to be parallel to a wall surface of the wall portion connected to the powder outflow opening portion 3c in the first powder flow path pipe 12, and each of the rod-shaped members 5a may be disposed to be vertically downward in a direction from the wall portion connected to the powder outflow opening portion 3c to another wall portion opposite to the wall portion. In this case, it is preferable that the plurality of rod-shaped members 5a constituting the collector 5 are rotatable around a rotation axis which is parallel to a wall surface of the wall portion connected to the powder outflow opening portion 3c in the first powder flow path pipe 12. As a result, a rotating force generated by the rod-shaped members 5a can be imparted to the powder aggregate R4 collected by the rod-shaped members 5a of the collector 5, which can assist the movement of the powder aggregate R4 to a downstream side in the tilting direction of the rod-shaped member 5a.

Figure 4A:
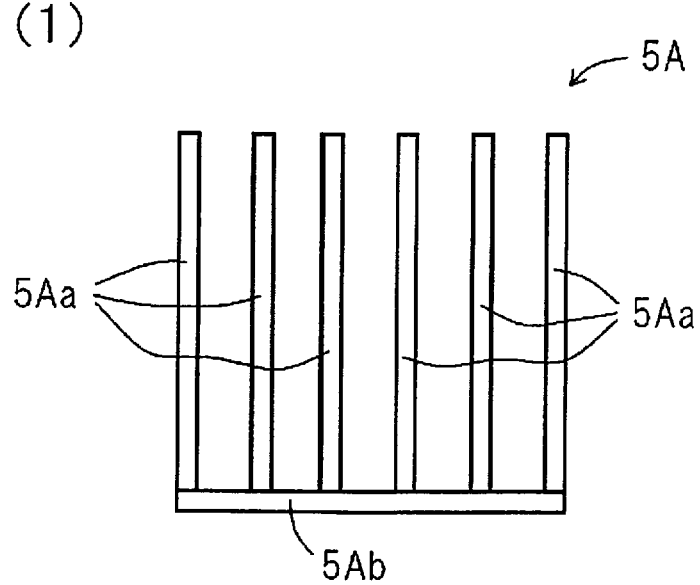
FIG. 4A is a schematic diagram showing a modified example of the collector 5.
Figure 4A:
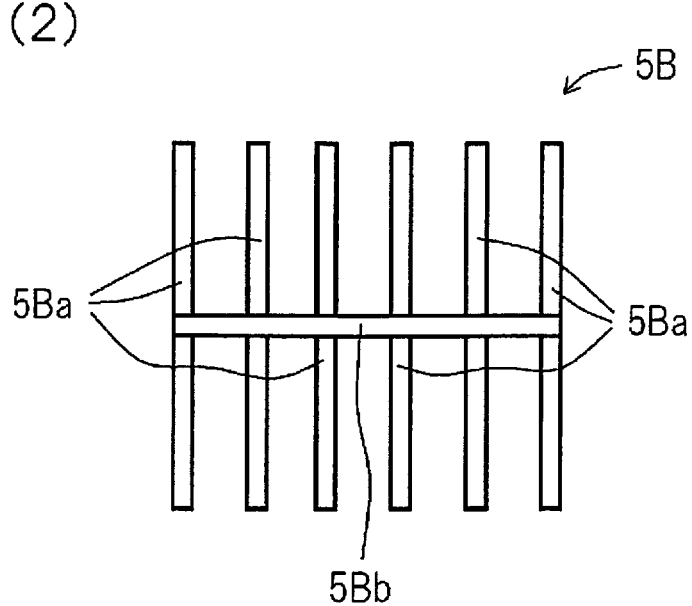
Figure 4B:
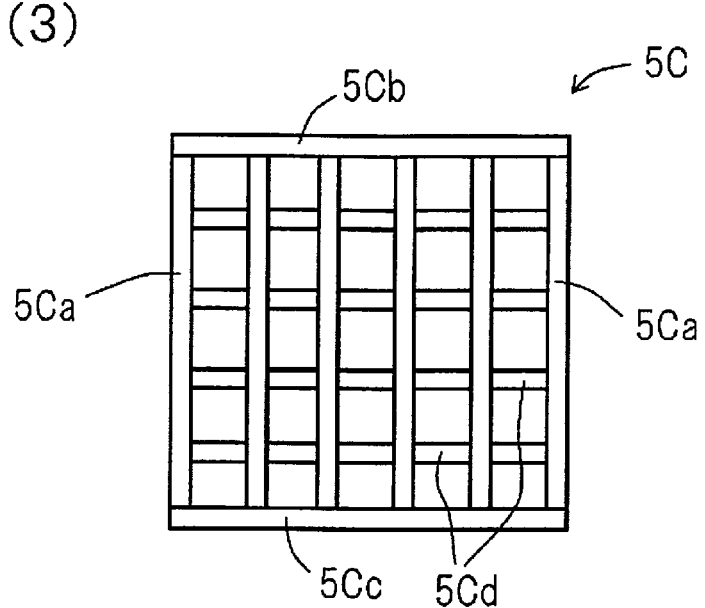
FIG. 4B is a schematic diagram showing a modified example of the collector 5.
Figure 4B:
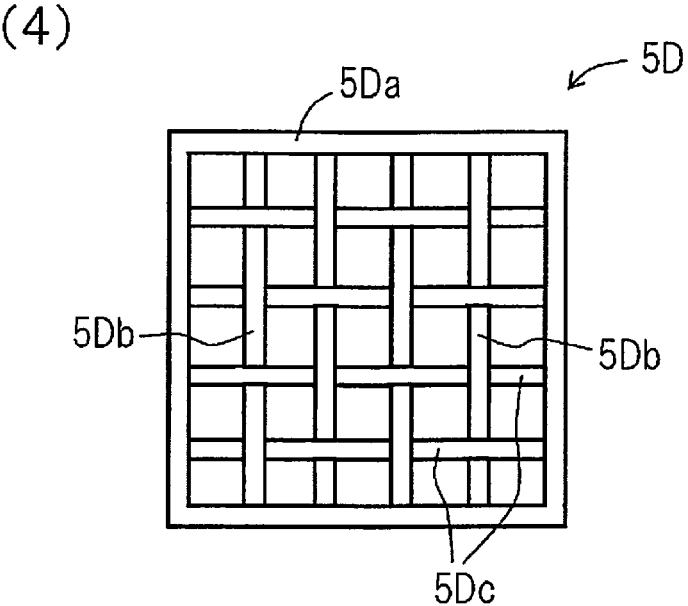

FIGS. 4A and 4B are schematic diagrams showing modified examples of the collector 5. The collector of the water-absorbent resin production apparatus 1 according to the embodiment is not limited to the configuration of the above-described collector 5 and may be configured as shown in FIG. 4A or 4B.

A collector 5A shown in FIG. 4A(1) has a comb-like shape as a whole. The collector 5A includes: a plurality of rod-shaped members 5Aa disposed parallel to each other at intervals which are greater than a size of the water-absorbent resin powder R3 which is passing through the inside of the first powder flow path pipe 12 and less than or equal to the powder aggregate index size of the powder aggregate R4; and a rod-shaped connecting member 5Ab which connects one end portions of the plurality of rod-shaped members 5Aa. The intervals between the plurality of rod-shaped members 5Aa are equal to each other, and "the size of the water-absorbent resin powder R3" for defining a lower limit value of the intervals is the upper limit value of the median particle size of the water-absorbent resin powder R3. In addition, as in the case of the rod-shaped members 5a of the above-described collector 5, it is preferable that the plurality of rod-shaped members 5Aa constituting the collector 5A are tilted in the first powder flow path pipe 12 with respect to the horizon and are columnar or cylindrical members, and the plurality of rod-shaped members 5Aa may be configured to be rotatable.

A collector 5B shown in FIG. 4A(2) has an antenna shape as a whole. The collector 5B includes: a plurality of rod-shaped members 5Ba disposed parallel to each other at intervals which are greater than a size of the water-absorbent resin powder R3 which is passing through the inside of the first powder flow path pipe 12 and less than or equal to the powder aggregate index size of the powder aggregate R4; and a rod-shaped connecting member 5Bb which connects center portions of the plurality of rod-shaped members 5Ba. In the collector 5B, the plurality of rod-shaped members 5Ba are not necessarily symmetrical to the connecting member 5Bb. For example, an asymmetrical configuration in which portions of the rod-shaped members 5Ba deviating from the centers are connected through the connecting member 5Bb may be adopted, or an asymmetrical configuration in which the plurality of rod-shaped members 5Ba are connected through the connecting member 5Bb which is tilted with respect to one imaginary straight line perpendicular to the rod-shaped members 5Ba may be adopted. The intervals between the plurality of rod-shaped members 5Ba are equal to each other, and "the size of the water-absorbent resin powder R3" for defining a lower limit value of the intervals is the upper limit value of the median particle size of the water-absorbent resin powder R3. In addition, as in the case of the rod-shaped members 5a of the above-described collector 5, it is preferable that the plurality of rod-shaped members 5Ba constituting the collector 5B are tilted in the first powder flow path pipe 12 with respect to the horizon and are columnar or cylindrical members, and the plurality of rod-shaped members 5Ba may be configured to be rotatable.

A collector 5C shown in FIG. 4B(3) has a net shape as a whole. The collector 5C includes: a plurality of first rod-shaped members 5Ca disposed parallel to each other at intervals which are greater than a size of the water-absorbent resin powder R3 which is passing through the inside of the first powder flow path pipe 12 and less than or equal to the powder aggregate index size of the powder aggregate R4; a rod-shaped first connecting member 5Cb which connects one end portions of the plurality of first rod-shaped members 5Ca; a rod-shaped second connecting member 5Cc which connects the other end portions of the plurality of rod-shaped members 5Ca; and a plurality of second rod-shaped members 5Cd that are disposed at intervals and are perpendicular to the first rod-shaped members 5Ca. The second rod-shaped members 5Cd are disposed in contact with surfaces of the first rod-shaped members 5Ca on the downstream side in the passing direction of the water-absorbent resin powder R3. The intervals between the plurality of first rod-shaped members 5Ca and the intervals between the plurality of second rod-shaped members 5Cd are equal to each other, and "the size of the water-absorbent resin powder R3" for defining a lower limit value of the intervals is the upper limit value of the median particle size of the water-absorbent resin powder R3. In addition, as in the case of the rod-shaped members 5a of the above-described collector 5, it is preferable that the plurality of first rod-shaped members 5Ca and the plurality of second rod-shaped members 5Cd constituting the collector 5C are columnar or cylindrical members, and the plurality of first rod-shaped members 5Ca and the plurality of second rod-shaped members 5Cd may be configured to be rotatable. In addition, as in the case of the rod-shaped members 5a of the above-described collector 5, it is preferable that the plurality of first rod-shaped members 5Ca are tilted in the first powder flow path pipe 12 with respect to the horizon.

A collector 5D shown in FIG. 4B(4) has a net shape as a whole. The collector 5D includes: a frame member 5Da having an opening; a plurality of first rod-shaped members 5Db disposed in the opening of the frame member 5Da; and a plurality of second rod-shaped members 5Dc disposed in the opening of the frame member 5Da. The plurality of first rod-shaped members 5Db are curved wavy, have opposite end portions connected to an inner peripheral portion of the opening of the frame member 5Da, and are disposed parallel to each other at intervals which are greater than a size of the water-absorbent resin powder R3 which is passing through the inside of the first powder flow path pipe 12 and less than or equal to the powder aggregate index size of the powder aggregate R4. The plurality of second rod-shaped members 5Dc are curved wavy, have opposite end portions connected to the inner peripheral portion of the opening of the frame member 5Da, are disposed at intervals, and are perpendicular to the first rod-shaped members 5Db in a plan view when seen from the passing direction of the water-absorbent resin powder R3. In addition, when the collector 5D is seen from an upstream side to a downstream side in the passing direction of the water-absorbent resin powder R3, the first rod-shaped member 5Db and the second rod-shaped member 5Dc are alternately exposed at intersections between the first rod-shaped members 5Db and the second rod-shaped members 5Dc. The intervals between the plurality of first rod-shaped members 5Db and the intervals between the plurality of second rod-shaped members 5Dc are equal to each other, and "the size of the water-absorbent resin powder R3" for defining a lower limit value of the intervals is the upper limit value of the median particle size of the water-absorbent resin powder R3. In addition, as in the case of the rod-shaped members 5a of the above-described collector 5, it is preferable that the plurality of first rod-shaped members 5Db and the plurality of second rod-shaped members 5Dc constituting the collector 5D are columnar or cylindrical members, and the plurality of first rod-shaped members 5Db and the plurality of second rod-shaped members 5Dc may be configured to be rotatable. In addition, as in the case of the rod-shaped members 5a of the above-described collector 5, it is preferable that either the plurality of first rod-shaped members 5Db or the plurality of second rod-shaped members 5Dc are tilted in the first powder flow path pipe 12 with respect to the horizon.

Figure 5:
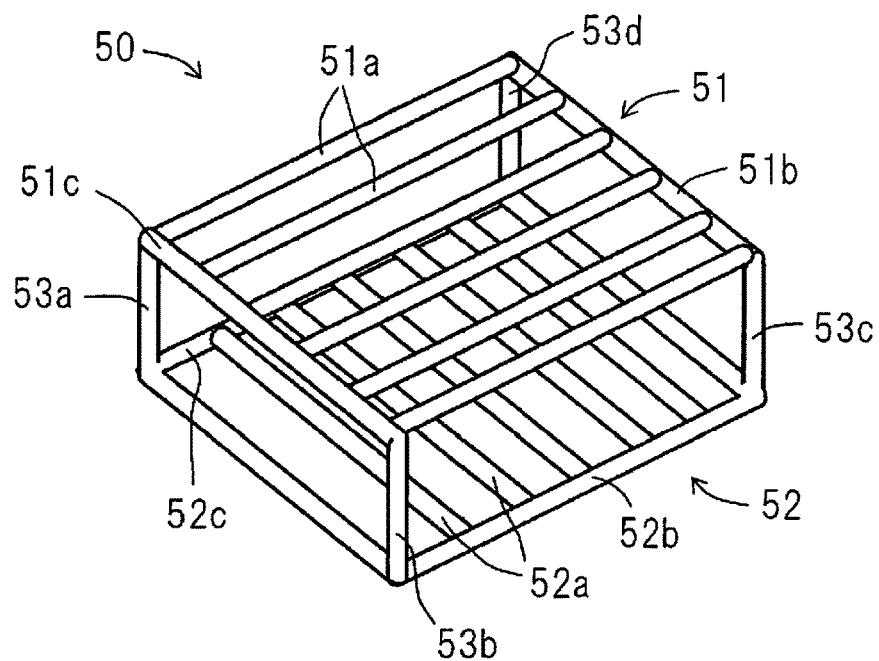
FIG. 5 is a schematic diagram showing a collector 50 as another example of the collector.

The collector of the water-absorbent resin production apparatus 1 according to the embodiment is not limited to the configurations of the above-described collectors 5, 5A, 5B, 5C, and 5D and may be configured as shown in FIG. 5. FIG. 5 is a schematic diagram showing a collector 50 as another example of the collector.

The collector 50 has a two-layer structure in which two collecting members including a collecting member 51 and a collecting member 52 are disposed parallel to each other at an interval in the passing direction of the water-absorbent resin powder R3 in the first powder flow path pipe 12.

In the collector 50, the collecting member 51 includes: a plurality of rod-shaped members 51a disposed parallel to each other at intervals which are greater than a size of the water-absorbent resin powder R3 which is passing through the inside of the first powder flow path pipe 12 and less than or equal to the powder aggregate index size of the powder aggregate R4; a rod-shaped first connecting member 51b which connects one end portions of the plurality of rod-shaped members 51a; and a rod-shaped second connecting member 51c which connects the other end portions of the plurality of rod-shaped members 51a. The intervals between the plurality of rod-shaped members 51a are equal to each other, and "the size of the water-absorbent resin powder R3" for defining a lower limit value of the intervals is the upper limit value of the median particle size of the water-absorbent resin powder R3.

The collecting member 51 including the plurality of rod-shaped members 51a, the first connecting member 51b, and the second connecting member 51c has a rectangular external shape as a whole corresponding to the rectangular tubular shape in which the first powder flow path pipe 12 is formed.

It is preferable that the plurality of rod-shaped members 51a constituting the collecting member 51 are tilted with respect to the horizon and linearly extend so as to be vertically downward in the first powder flow path pipe 12 in a direction from a wall portion connected to the powder outflow opening portion 3c toward another wall portion opposite to the wall portion.

In addition, it is preferable that the plurality of rod-shaped members 51a constituting the collecting member 51 are columnar or cylindrical members and are rotatable.

In the collector 50, the collecting member 52 is disposed downstream of the collecting member 51 at an interval in the passing direction of the water-absorbent resin powder R3. The collecting member 52 includes: a plurality of rod-shaped members 52a disposed parallel to each other at intervals which are greater than a size of the water-absorbent resin powder R3 which is passing through the inside of the first powder flow path pipe 12 and less than or equal to the powder aggregate index size of the powder aggregate R4; a rod-shaped first connecting member 52b which connects one end portions of the plurality of rod-shaped members 52a; and a rod-shaped second connecting member 52c which connects the other end portions of the plurality of rod-shaped members 52a. The intervals between the plurality of rod-shaped members 52a are equal to each other, and "the size of the water-absorbent resin powder R3" for defining a lower limit value of the intervals is the upper limit value of the median particle size of the water-absorbent resin powder R3.

The collecting member 52 constituted by the plurality of rod-shaped members 52a, the first connecting member 52b, and the second connecting member 52c has a rectangular external shape as a whole corresponding to the rectangular cylindrical shape in which the first powder flow path pipe 12 is formed.

In addition, the plurality of rod-shaped members 52a constituting the collecting member 52 may linearly extend to be parallel to a wall surface of the wall portion connected to the powder outflow opening portion 3c in the first powder flow path pipe 12. That is, an extending direction of the plurality of rod-shaped members 52a constituting the collecting member 52 is perpendicular to an extending direction of the plurality of rod-shaped members 51a constituting the collecting member 51.

In addition, it is preferable that the plurality of rod-shaped members 52a constituting the collecting member 52 are columnar or cylindrical members and are rotatable.

In the collector 50, corners of the collecting member 51 having a rectangular external shape are connected to those of the collecting member 52 having a rectangular external shape through inter-member connecting members 53a, 53b, 53c, and 53d.

The above-described collector 50 is disposed in the first powder flow path pipe 12 through which the water-absorbent resin powder R3 passes. As a result, as in the case of the above-described collector 5, the powder aggregate R4 can be prevented from flowing into the powder flow rate regulating discharge member 4 described below connected to the other end portion of the first powder flow path pipe 12 on the classifier side. As a result, the powder aggregate R4 is prevented from, for example, getting involved in a driving portion of the powder flow rate regulating discharge member 4, an increase in the drive load is suppressed, and the driving of the powder flow rate regulating discharge member 4 can be prevented from becoming unstable and stopping. Therefore, a decrease in the production efficiency of the water-absorbent resin can be suppressed. Accordingly, in the water-absorbent resin production apparatus 1, the water-absorbent resin as a particulate powder can be produced with high production efficiency in a state where the powder aggregate R4 is removed therefrom.

Returning to FIGS. 1 and 2, in the water-absorbent resin production apparatus 1 according to the embodiment, the powder flow rate regulating discharge member 4 is connected to the other end portion of the first powder flow path pipe 12. The powder flow rate regulating discharge member 4 discharges the water-absorbent resin powder R3, which passes through the inside of the first powder flow path pipe 12 and passes through the collector 5 (or the collector 5A, 5B, 5C, 5D, or 50) while regulating a flow rate of the water-absorbent resin powder R3 so as to be a predetermined value. The predetermined value of the flow rate at which the water-absorbent resin powder R3 discharged by the powder flow rate regulating discharge member 4 is a value determined based on the classification efficiency of the classifier 6 described below. Specifically, the predetermined value of the flow rate at which the water-absorbent resin powder R3 discharged by the powder flow rate regulating discharge member 4 is a value determined based on the throughput of the classifier 6 and is set as, for example, 0.1 to 6 T/hr.

The powder flow rate regulating discharge member 4 is realized by, for example, a rotary valve or a screw feeder. In the embodiment, the powder flow rate regulating discharge member 4 includes: a second powder flow path pipe 4c which is a cylindrical powder flow path member; and a hopper 4a and a rotary valve 4b which are flow rate regulating members. In the powder flow rate regulating discharge member 4 having the above-described configuration, the water-absorbent resin powder R3 which passes through the inside of the first powder flow path pipe 12 and passes through the collector 5 (or the collector 5A, 5B, 5C, 5D, or 50) is temporarily stored in the hopper 4a, and is discharged through the second powder flow path pipe 4c by the rotation of the rotary valve 4b while the flow rate is regulated so as to be the predetermined value.

In the water-absorbent resin production apparatus 1 according to the embodiment, the classifier 6 is connected to the second powder flow path pipe 4c of the powder flow rate regulating discharge member 4. The classifier 6 classifies the water-absorbent resin powder R3 discharged from the second powder flow path pipe 4c.

The classifier 6 is not particularly limited, and examples thereof include a vibration sieve (for example, an unbalanced weight driving type, a resonance type, a vibrating motor type, an electromagnetic type, or a disk vibrating type), an in-plane motion sieve (for example, a horizontal motion method, a horizontal circle-linear motion method, and a three-dimensional circular motion method), a movable net sieve, a compulsory stirring sieve, a net plane vibration sieve, a wind force sieve, and a sonic sieve. Among these, a vibration sieve or an in-plane motion sieve is used in the embodiment.

Hereinafter, the invention will be described in more detail based on Examples. However, the invention is not limited to these Examples.

Example 1

A water-absorbent resin was produced using the water-absorbent resin production apparatus shown in FIGS. 1 and 2. In the water-absorbent resin production apparatus, the collector was disposed in the first powder flow path pipe. When the operation of the water-absorbent resin production apparatus was performed, the driving portion of the powder flow rate regulating discharge member was stopped due to an overload 92 days after the start of the operation. When the maintenance of the driving portion was performed, the driving portion of the powder flow rate regulating discharge member was stopped due to an overload 77 days after the restart of the operation. When the maintenance of the driving portion was performed again, the driving portion of the powder flow rate regulating discharge member was stopped due to an overload 115 days after the restart of the operation.

In addition, in a case where a water-absorbent resin was obtained using the water-absorbent resin powder obtained in Example 1, the water absorption capacity was 64 g/g, and the water absorption capacity under pressure was 15 ml/g. On the other hand, in a case where a water-absorbent resin was obtained using the powder aggregate collected by the collector, the water absorption capacity was 45 g/g, and the water absorption capacity under pressure was 8 ml/g. Based on values measured using the measuring device shown in FIG. 6, the water absorption capacity under pressure was obtained from the above Expression (1), and the water absorption capacity was obtained from the above Expression (2).

Comparative Example 1

A water-absorbent resin was produced using a water-absorbent resin production apparatus having the same configuration as that of the Example 1 except that the collector was not disposed in the first powder flow path pipe. When the operation of the water-absorbent resin production apparatus was performed, the driving portion of the powder flow rate regulating discharge member was stopped due to an overload 14 days after the start of the operation. When the maintenance of the driving portion was performed, the driving portion of the powder flow rate regulating discharge member was stopped due to an overload 20 days after the restart of the operation. When the maintenance of the driving portion was performed again, the driving portion of the powder flow rate regulating discharge member was stopped due to an overload 10 days after the restart of the operation.

It can be clearly seen from the results of Example 1 and Comparative Example 1 that, by providing the collector in the first powder flow path pipe, the powder aggregate can be removed, and a water-absorbent resin as a particulate powder can be produced with high production efficiency. In addition, it can be seen that, in Example 1, the powder aggregate having poor properties as the water-absorbent resin was able to be removed by the collector and thus a high-quality water-absorbent resin was able to be produced.

The invention may be embodied in other specific forms without departing from the spirit or essential characteristics thereof. The present embodiments are therefore to be con-

REFERENCE SIGNS LIST

1: Water-absorbent resin production apparatus
2: Polymerization reactor
2a: Reactor main body
2b: Resin composition outflow opening portion
2c: Stirring means
3: Dryer
3a: Dryer main body
3b: Resin composition inflow opening portion
3c: Powder outflow opening portion
4: Powder flow rate regulating discharge member
4a: Hopper
4b: Rotary valve
4c: Second powder flow path pipe
5, 5A, 5B, 5C, 5D: Collector
5a: Rod-shaped member
5b: First connecting member
5c: Second connecting member
50: Collector
51: Collecting member
51a: Rod-shaped member
51b: First connecting member
51c: Second connecting member
52: Collecting member
52a: Rod-shaped member
52b: First connecting member
52c: Second connecting member
53a, 53b, 53c, 53d: Inter-member connecting member
6: Classifier
11: Resin composition flow path pipe
11a: Resin composition flow path opening-closing valve
12: First powder flow path pipe
12a: Opening portion
12b: Lid portion
100: Measuring device
131: Burette portion
131a: Burette
131b: Air introduction tube
131c: Cock
131d: Cock
132: Conduit
133: Measuring stand
134: Measuring portion
134a: Cylindrical portion
134b: Nylon mesh
134c: Weight
135: Water-absorbent resin

The invention claimed is:

1. A water-absorbent resin production apparatus, comprising:
a polymerization reactor provided with a resin composition outflow opening portion, in the polymerization reactor a water-soluble ethylenically unsaturated monomer being polymerized to obtain a water-absorbent resin composition including a water-absorbent resin as a polymer of the water-soluble ethylenically unsaturated monomer, the water-absorbent resin composition flowing out from the polymerization reactor through the resin composition outflow opening portion;
a resin composition flow path member having one end portion connected to the resin composition outflow opening portion, the resin composition flow path member functioning as a flow path through which the water-absorbent resin composition flowing out from the resin composition outflow opening portion passes;
a dryer drying the water-absorbent resin composition to obtain a water-absorbent resin powder,
the dryer being provided with a resin composition inflow opening portion which is connected to the other end portion of the resin composition flow path member, and a powder outflow opening portion,
the water-absorbent resin composition passing through an inside of the resin composition flow path member and flowing into the dryer through the resin composition inflow opening portion,
absorbent resin composition in the dryer and flowing out from the dryer through the powder outflow opening portion;
a powder flow path member having one end portion connected to the powder outflow opening portion, the powder flow path member functioning as a flow path through which the water-absorbent resin powder flowing out from the powder outflow opening portion passes;
a collector disposed in the powder flow path member, the collector collecting a powder aggregate having a greater size than a predetermined size in a powder aggregate of the water-absorbent resin powder passing through the inside of the powder flow path member;
a powder flow rate regulating discharge member connected to the other end portion of the powder flow path member, the powder flow rate regulating discharge member discharging the water-absorbent resin powder which passes through the collector, while regulating a flow rate at which the water-absorbent resin powder is discharged from the powder flow rate regulating discharge member, so as to be a predetermined value; and
a classifier connected to the powder flow rate regulating discharge member, the classifier classifying the water-absorbent resin powder discharged from the powder flow rate regulating discharge member.

2. The water-absorbent resin production apparatus according to claim 1,
wherein the collector includes
a plurality of rod-shaped members disposed parallel to each other at intervals, the intervals being greater than a size of the water-absorbent resin powder and less than or equal to the predetermined size of the powder aggregate, and
a connecting member connecting the plurality of rod-shaped members.

3. The water-absorbent resin production apparatus according to claim 2,
wherein the plurality of rod-shaped members are tilted in the powder flow path member with respect to horizon.

4. The water-absorbent resin production apparatus according to claim 2,
wherein the plurality of rod-shaped members are columnar or cylindrical members.

5. The water-absorbent resin production apparatus according to claim 3,
wherein the plurality of rod-shaped members are columnar or cylindrical members.

* * * * *